United States Patent Office 2,797,890
Patented July 2, 1957

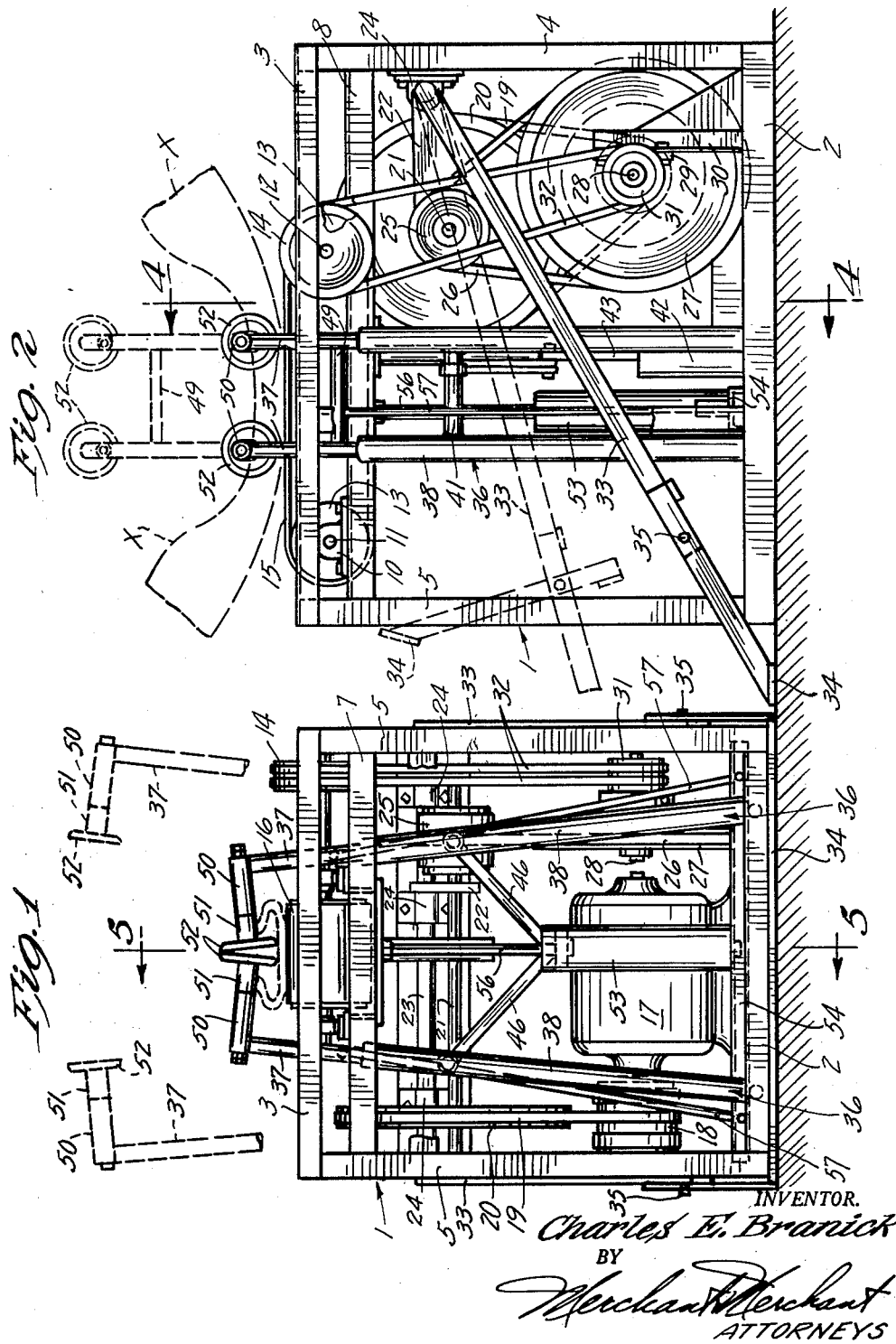

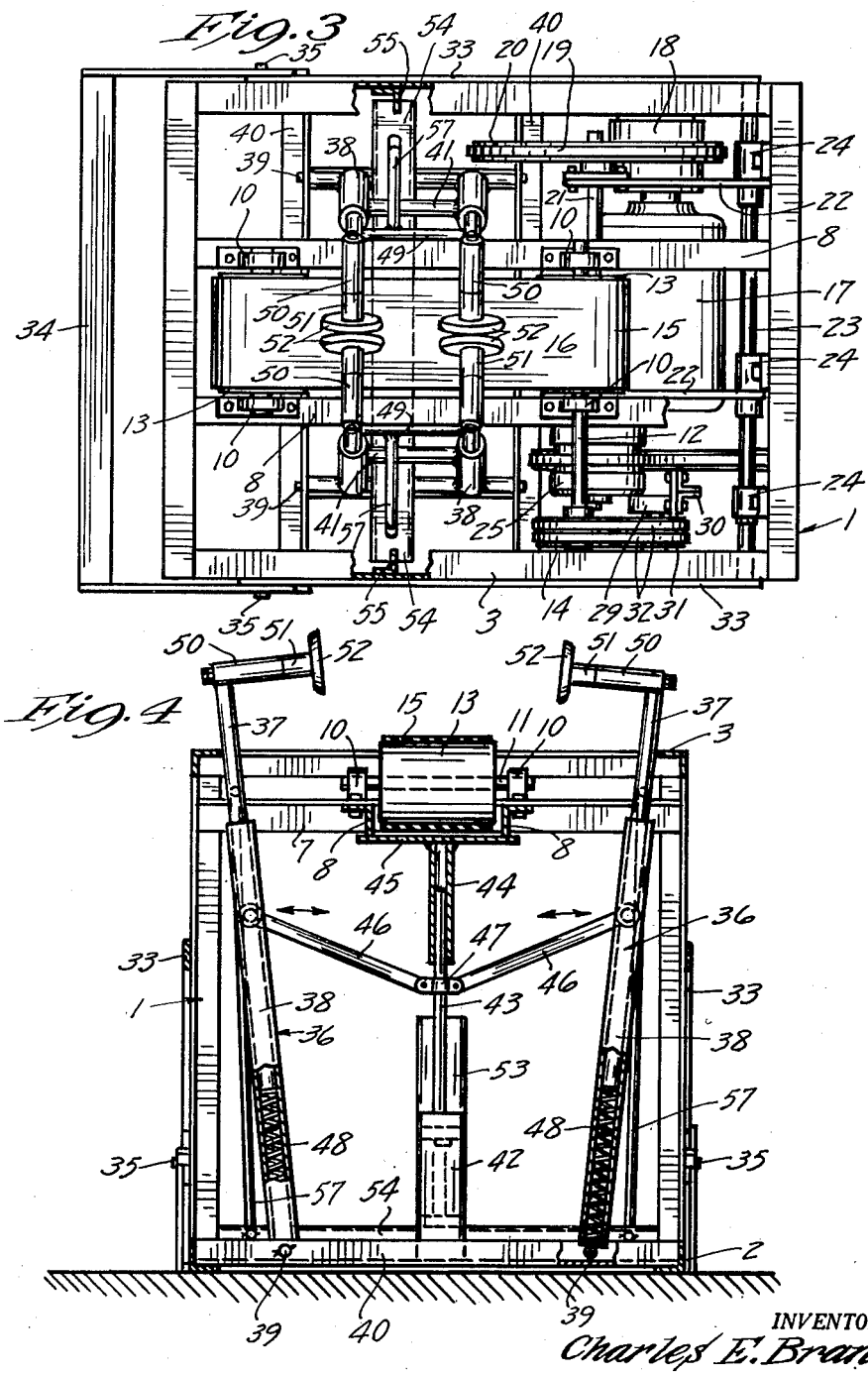

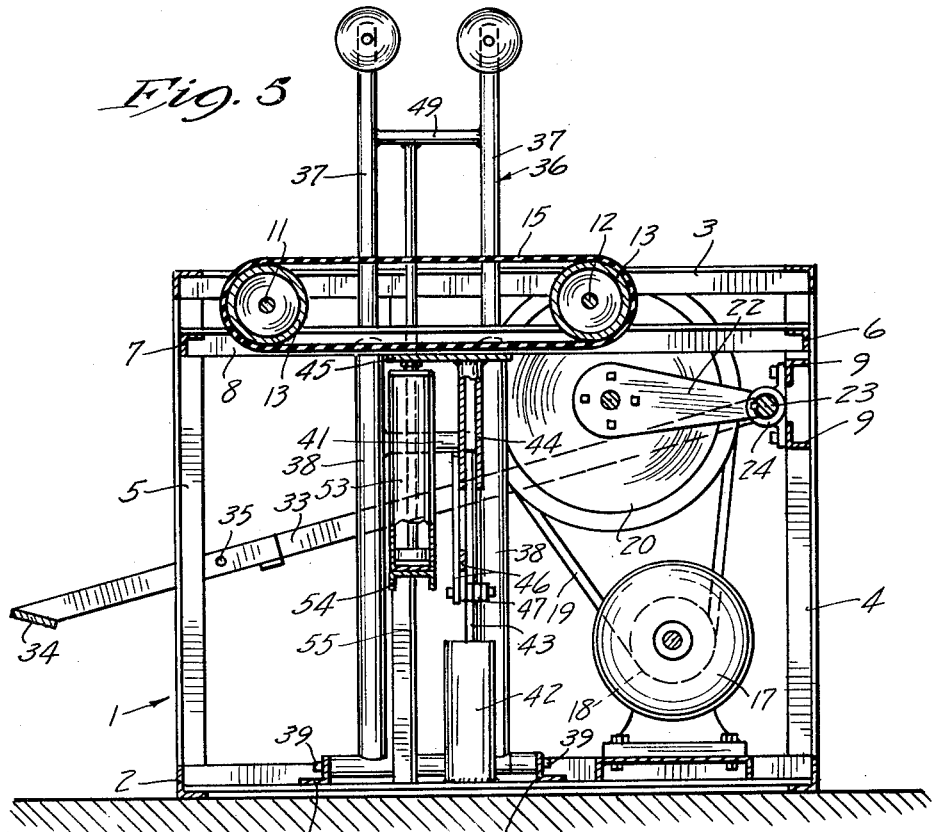
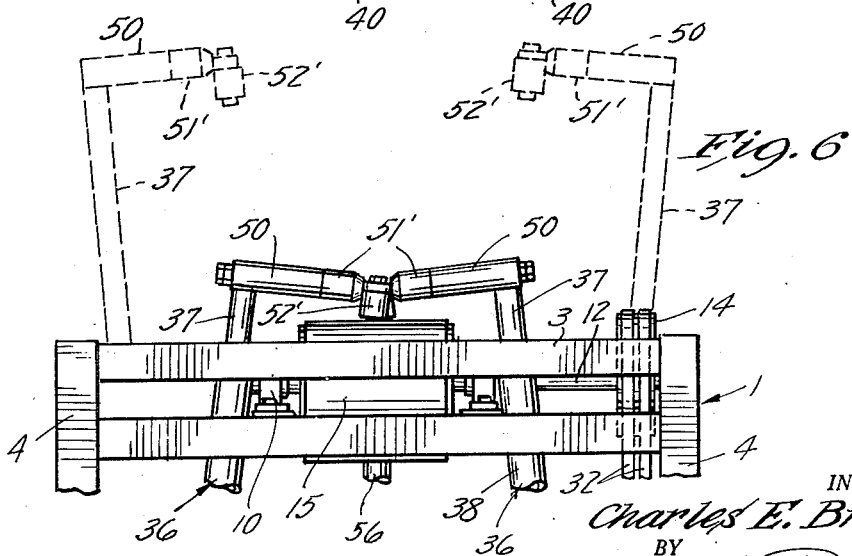

2,797,890

MACHINE FOR SPREADING AND INSPECTING PNEUMATIC TIRE CASINGS

Charles E. Branick, Fargo, N. Dak.

Application November 4, 1954, Serial No. 466,756

4 Claims. (Cl. 254—50.3)

My invention relates broadly to tire inspection machines and has for its primary object the provision of a novel device whereby tire casings may be quickly inspected to determine the condition of both the interior and exterior portions thereof.

More specifically the object of my invention is the provision of novel means whereby a tire casing may be simultaneously rotated on a horizontal axis while the bead portions of the tire adjacent the bottom thereof are either spread apart a desired extent to enable one to readily inspect the interior of the cord carcass—or are depressed while in an unspread condition to flatten out the carcass at said point to facilitate inspection of the exterior rubber covering to determine the existence of radial cracks and the like.

A further and highly important object of my invention is the provision of a device of the class described wherein the tire casing may be rotated at variable speeds and held stationary in a vertical position at any given point when desired. Relatively slow rotation of a tire casing with the ability to stop same when desired is highly desirable for inspection.

A still further object of my invention is the provision of a device of the class described wherein a tire casing may be quickly and rapidly rotated about a horizontal axis without first mounting the tire on a rim and inflating same, whereby new tires or newly retreaded or recapped tires may be quickly trimmed to remove undesirable mold flashings, vent aperture projections and the like.

A still further object of my invention is the provision of a device of the class described which is easy to operate, is positive in its action, is rugged in construction and durable in use.

The above and still further objects of my invention will become apparent from the following detailed specification, appended claims and attached drawings.

Referring to the drawings wherein like characters indicate like parts throughout the several views:

Fig. 1 is a view in front elevation of my novel structure;

Fig. 2 is a view in side elevation;

Fig. 3 is a view in top plan;

Fig. 4 is a sectional view as seen substantially from the line 4—4 of Fig. 2;

Fig. 5 is a sectional view taken substantially on the line 5—5 of Fig. 1; and

Fig. 6 is an enlarged fragmentary detail corresponding substantially to Fig. 4 but showing a slightly modified form of some of the parts thereof.

Referring with greater particularity to the drawings, the numeral 1 indicates in its entirety a skeletonized box-like frame structure, the rectangular bottom portion of which is identified by the numeral 2, the top portion by the numeral 3, the rear legs by the numeral 4 and the front legs by the numeral 5. End frame members 6 and 7 extend between the rear legs 4 and the front legs 5 respectively below the level of the top portion 3. Connected at their opposite end portions to the end frame members 6 and 7 are a pair of parallel supporting rails 8, preferably and as shown being formed from angle irons or the like, and disposed in laterally spaced relationship. The two rear legs 4 are also connected by a pair of cross members 9 for a purpose which will hereinafter appear.

Mounted on the supporting rails 8 in spaced relation longitudinally thereof are suitable bearings 10, one cooperating pair of which journals a shaft 11 and the other cooperating pair of which journals a shaft 12. Rollers 13 are rigidly secured to the shafts 11 and 12 between their respective bearings 10, the latter of which is provided with a drive pulley 14. A horizontally disposed endless belt 15 runs over the rollers 13 and provides a means for supporting and for imparting rotary movement to a pneumatic tire casing shown in dotted lines, and identified by the letter "X" in Fig. 2. Preferably the tire-engaging surface 16 is coated with an abrasive to facilitate traction therebetween and the tread portion of the tire casing "X."

In order to impart variable speeds to the belt 15, I provide drive means including a motor 17 anchored to the bottom frame 2. Variable pitch pulley 18 is rigidly mounted on the shaft of the motor 17 and has running thereover an endless V-belt 19 which runs over a relatively large pulley 20 rigidly mounted on a shaft 21 that is mounted for generally upward and downward movements with respect to the motor 17 in the outer ends of a pair of laterally spaced rock arms 22. The shaft 21 is preferably journalled in suitable bearings at the outer ends of said arms 22, the inner ends of the rock arms 22 being rigidly secured to a rock shaft 23 that extends parallel to the shaft 21, and which is journalled in suitable bearings 24 mounted on the cross arms 9 of the frame structure. A variable speed pulley 25 identical in construction to the pulley 18 is rigidly mounted on the shaft 21, and has running thereover an endless V-belt 26 which runs over a relatively large pulley or sheave 27, that is rigidly mounted on a relatively short shaft 28. The shaft 28 is journalled in a bearing 29 that is mounted on a mounting bracket 30 rigidly secured to the bottom frame 2. A relatively small sheave or pulley 31, of the double V type, is also rigidly mounted on the shaft 28, and has running thereover a pair of V-belts 32 which also run over the drive pulley 14 which, like the pulley 31 is of the double V type. The variable pitch pulleys 18 and 25 may be of any commercially available type. These pulleys, in themselves, do not constitute the instant invention and hence, for the sake of brevity, detailed showing and description thereof is deemed unnecessary.

In order to impart rocking movements to the rock shaft 23, whereby to raise and lower the shaft 21 and pulleys 20 and 25 carried thereby, I provide a pair of operating arms 33 which extend angularly forwardly and downwardly from the opposite ends of the rock shaft 23 and terminate in a connecting treadle or the like 34, which extends transversely of the machine forwardly of the front legs 5 thereof. Preferably, and as shown, the arms 33 are jointed intermediate their ends, as indicated at 35, to provide forward and rearward arm sections to facilitate folding for the purpose of shipment.

A pair of double legs 36, one on each side of tire supporting belt 15, see particularly Figs. 1 and 4, include telescoping upper and lower sections 37 and 38 respectively. The lower leg sections 38 at their bottom ends are pivotally secured, as indicated at 39, to longitudinally spaced points of a transversely extended frame member 40 of the bottom frame 2, for swinging movements transversely of the tire supporting belt 15. The lower leg sections 38 of each pair thereof are connected by a tie rod or the like 41 whereby the legs of each pair partake of common swinging movements. Means for imparting said swinging movements to the legs 36 comprises a fluid pressure cylinder 42 having a piston equipped plunger rod 43 mounted therein for extending and retracting movements in a vertical plane intermediate the legs 36. Preferably and as shown, the cylinder 42 is suitably mounted to the transverse frame member 40, the upper end of the plunger rod 43 being slidably received in a tubular guide sleeve 44 which, at its upper end, is welded or otherwise rigidly secured to a mounting plate 45, welded or otherwise anchored to the bottom surfaces of the longitudinally extended supporting rails 8 below the level of the lower flight of the endless belt 15, see particularly Fig. 4. A pair of toggle-acting links 46 are connected at their outer ends to a different one of the tie rods 41, and at their inner ends to a collar or the like 47, rigidly secured to the plunger rod 43. Upward movement of the plunger rod 43 will cause the toggle-acting links 46 to impart laterally outward movement to the legs 36, as shown in Fig. 4, whereas downward movement of the plunger rod 43 will cause the legs 36 to move toward each other as shown in Fig. 1.

As shown, coil compression springs 48 within the lower end portions of the tubular lower leg sections 38 bias the upper leg sections 37 in an upward direction. Tie rods 49, similar to the tie rods 41, rigidly connect the upper leg sections of each pair together for common extending and retracting movements with respect to the lower leg sections 38. Rigidly secured to the upper end portions of the double leg sections 36 are opposed laterally projecting arms 50, to the adjacent ends of which are journalled tire bead engaging rollers 51, preferably and as shown, formed with integral circular flanges 52 at their extreme ends.

For the purpose of raising and lowering the upper leg sections 37 whereby the rollers 51 may be brought into proper engagement with the tire "X," I provide fluid pressure operated mechanism in the nature of a cylinder 53, which extends vertically from, and which is rigidly secured to the central portion of a cross head 54, mounted and guided for vertical movements by a pair of vertically disposed angle irons or the like 55, at opposite sides of the supporting frame 1. A piston equipped plunger 56 extends vertically from the upper end of the cylinder 53 and is welded or otherwise rigidly secured at its upper end to the mounting plate 45. A pair of control rods 57 are pivotally secured at their lower ends to the opposite end portions of the cross head 54, and at their upper ends each to a different tie rod 49. With this arrangement, when fluid under pressure is introduced into the upper end of the cylinder 53, the cylinder and cross head 54, together with the control links or rods 57, will be caused to move in an upward direction thereby raising the upper leg sections and tire bead engaging rollers 51 thereon toward the level of the axis of a tire casing resting vertically on the endless belt 15. When fluid is allowed to escape from the upper end portion of the cylinder 53, the upper leg sections 37, cross head 54, and control rods 57, together with the parts carried thereby, descend under the action of gravity, this descent being cushioned by the coil compression springs 48. When desired, fluid under pressure may be introduced to the bottom of the cylinder 53 to forcibly move the cross head 54 and parts carried thereby in a downward direction against bias of the springs 48.

When it is desired to inspect the interior of a tire casing "X," fluid under pressure is introduced into the bottom of the cylinder 42, through valves and conduits not shown, to elevate the piston equipped plunger 43 to the position of Fig. 2 and hence move the links 46 and the legs 36 to the spread positions thereshown. Next the tire casing "X" is placed upon the belt 15 between the rollers 13, as shown in Fig. 2, and intermediate the pair of double legs 36, as shown particularly in Fig. 1. Thereafter, the air is discharged from the cylinder 42 whereby to allow the piston equipped plunger to drop within the cylinder 42 under the action of gravity or under yielding bias of a spring, not shown, interposed between the piston and the upper end of the cylinder 42 whereby to bring the rollers 51 into side by side relationship above the level of the beads of the casing "X." Finally, air under pressure is introduced into the bottom of the cylinder 53 to force the cross head 54 downward on the guide rail 55 whereby, through the control rods 57, to lower the upper leg sections 37 and parts carried thereby against the bias of compression springs 48. Such movement will eventually cause flanges 52 to be inserted between the bead portions with the roller elements 51 riding two each on opposite bead portions.

Next the electric motor 17 is energized whereby to impart rotation to the tire casing "X," through the variable speed transmission mechanism above described, which is interposed between said motor 17 and the roller 13 over which belt 15 passes. Finally a sufficient amount of spreading of the beads of the tire is accomplished by lateral spreading of the legs 36, in the manner immediately above described, to enable one to inspect the interior thereof. Progressively slower movement of the belt 15 and consequently progressively slower rotation of the tire casing "X" is accomplished by upward movements of the treadle equipped operating arms 33. Complete stoppage of the belt 15 may be accomplished by switching off the current to the motor 17 from time to time. Such stoppage is frequently necessitated in order to properly mark the interior of the carcass for breaks, holes, etc.

When it is desired to inspect the side walls of the tire casing "X" to determine the presence or absence of radial cracks or the like, tire "X" is mounted upon the belt 15 as above described, and the upper leg sections 37 are depressed sufficiently to cause a desired flattening of the tire casing "X," as shown in Fig. 1. Here again the desired speed of rotation of the tire casing "X," during such inspection, may be varied by raising or lowering the treadle equipped operating arms 33, as the situation requires.

When it is desired to rotate the tire at relatively high speeds for the purpose of trimming mold flashings and the like therefrom, the tire casing "X" is mounted upon the belt 15, as above described, with the rollers engaging the opposite bead portions thereof only sufficiently firmly to retain same in an upright position withou undue flatening. The treadle equipped operating arms 57 are then lowered until the desired speed of rotation is achieved for the purpose, whereupon the trimming knife or the like is brought into engagement with, or in sufficiently close proximity therewith to accomplish the objective. Quite obviously, the abrasive surface 16 upon the belt 15 prevents slippage between the belt 15 and the peripheral surface of the tire casing "X."

In the slightly modified structure of Fig. 6, all parts with the exception of the roller elements 51' are identical with those of Figs. 1 to 5 inclusive. As shown in Fig. 6, rollers 51' are not provided with integrally formed flanges as is the case with rollers 51. In lieu of said flanges 52, separate roller elements 52', which rotate on substantially vertical axes and which project below the plane of the roller elements 51', are provided. Also as shown, the opposed arms 50 of Fig. 6 are laterally staggered so as to permit the roller elements 52', associated with one of the double legs 36, to come into side by side relationship with the roller elements 52' of the opposed double leg 36. This arrangement of parts makes it possible to enter the rollers 52' between the bead portions of a tire casing "X" where said bead portions are normally too closely spaced to permit entry therebetween of the opposed flanged rollers 51.

My invention has been thoroughly tested and found to be completely satisfactory for the accomplishment of the above objects and while I have shown and described a preferred and one slightly modified embodiment thereof, I wish it to be specifically understood that same is capable of considerably further modification without departure from the scope of the appended claims.

What I claim is:

1. In a device of the class described, a frame, a pair of laterally spaced rollers journalled for rotation in said frame, a horizontally disposed endless tire supporting belt running over said rollers, power operated mechanism for imparting tire rotating movement to said belt, a pair of upstanding legs one on each side of said belt intermediate said rollers, said legs including telescoping upper and lower leg sections, said lower leg sections being pivotally secured at their lower end portions for swinging movements of their upper ends toward and away from each other transversely of said belt, power operated mechanism for imparting swinging movements to said legs, power operated mechanism for imparting raising and lowering movements to said telescoping upper leg sections, and opposed tire bead and engaging rollers on the upper ends of said legs.

2. The structure defined in claim 1 in further combination with manually movable means for adjusting the speed of tire rotating movement of said tire supporting belt.

3. The structure defined in claim 1 in which the power operated mechanism for imparting swinging movements to said legs includes a fluid pressure operated extensible and retractable member mounted on said frame for generally vertical movements between said legs, a pair of toggle links pivotally connected at their inner ends to said extensible and retractable member, and pivotally connected at their outer ends one each to one of said legs, and means including a guide sleeve connected to the frame for retaining said extensible and retractable member against lateral movements in said frame.

4. The structure defined in claim 3 in which the power operated mechanism imparting raising and lowering movements to said telescopic upper leg sections includes an elongated cross-head extending transversely of said belt, means engaging opposite ends of said crosshead and guiding the same for vertical movements, a pair of rods pivotally connected at their lower ends one each to an opposite end portion of said crosshead and at their upper ends to an adjacent one of said upper telescoping leg sections, and a fluid pressure operated cylinder and cooperating plunger rod one anchored to the intermediate portion of said crosshead and the other rigidly secured to said frame.

References Cited in the file of this patent

UNITED STATES PATENTS

| 1,863,764 | Prentice | June 21, 1932 |
| 2,266,327 | McGowan | Dec. 16, 1941 |
| 2,375,595 | Stoehr | May 8, 1945 |